United States Patent [19]

Seidel et al.

[11] Patent Number: 4,701,684
[45] Date of Patent: Oct. 20, 1987

[54] DOOR OR GATE OBSTRUCTION CONTROL

[75] Inventors: Raymond L. Seidel, Croydon; Marian Viola, Redwood Park, both of Australia

[73] Assignee: Automatic Roller Doors Australia Pty. Ltd., Australia

[21] Appl. No.: 801,956

[22] Filed: Nov. 26, 1985

[30] Foreign Application Priority Data

Nov. 26, 1984 [AU] Australia .................. PG8291
Sep. 11, 1985 [AU] Australia .................. PH2382

[51] Int. Cl.$^4$ .................. H02P 1/22; G05D 3/10
[52] U.S. Cl. .................. 318/282; 318/456; 318/469; 318/473; 49/28
[58] Field of Search .................. 49/26, 28; 318/282, 318/445, 450, 452, 453, 454, 455, 456, 466, 467, 468, 469, 471, 472, 473

[56] References Cited

U.S. PATENT DOCUMENTS

| | | | |
|---|---|---|---|
| 3,891,909 | 6/1975 | Newson | 318/469 |
| 4,220,900 | 9/1980 | Mintz | 318/266 |
| 4,234,833 | 11/1980 | Barrett | 318/468 X |
| 4,347,465 | 8/1982 | Goertler et al. | 318/466 X |
| 4,394,605 | 7/1983 | Terazawa | 318/291 X |
| 4,468,596 | 8/1984 | Kinzl et al. | 318/468 X |
| 4,514,670 | 4/1985 | Fassel et al. | 318/467 |
| 4,563,623 | 1/1986 | Matsuka | 318/311 |
| 4,628,234 | 12/1986 | Mizuta et al. | 318/469 X |

FOREIGN PATENT DOCUMENTS

| | | |
|---|---|---|
| WO85/01773 | 4/1985 | PCT Int'l Appl. |
| 2010957 | 7/1979 | United Kingdom |
| 1604266 | 12/1981 | United Kingdom |

Primary Examiner—Bentsu Ro
Attorney, Agent, or Firm—Burns, Doane, Swecker & Mathis

[57] ABSTRACT

An obstruction sensing and control arrangement for door or gate opening-closing mechanisms. The arrangement compares the operating rate of change of a predetermined characteristic with a preset rate of change and stops or reverses the motor in the opening/closing mechanism. The characteristic preferred is motor body temperature which is monitored indirectly. The control arrangement also includes a back up static control threshold to sense a second static operating characteristic of the motor and a second comparator means set at a preset threshold level to stop or reverse the motor. A common motor sensor is used for both the dynamic and static control thresholds. The invention also includes means to sense operating temperature and to alter the preset static threshold level automatically in response to temperature changes.

11 Claims, 6 Drawing Figures

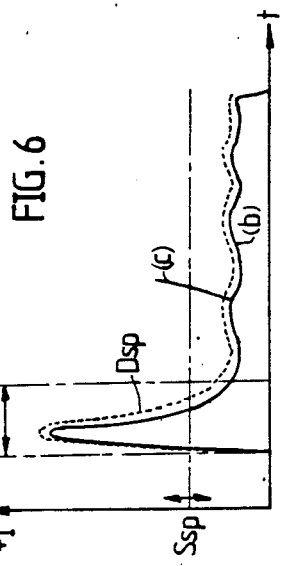
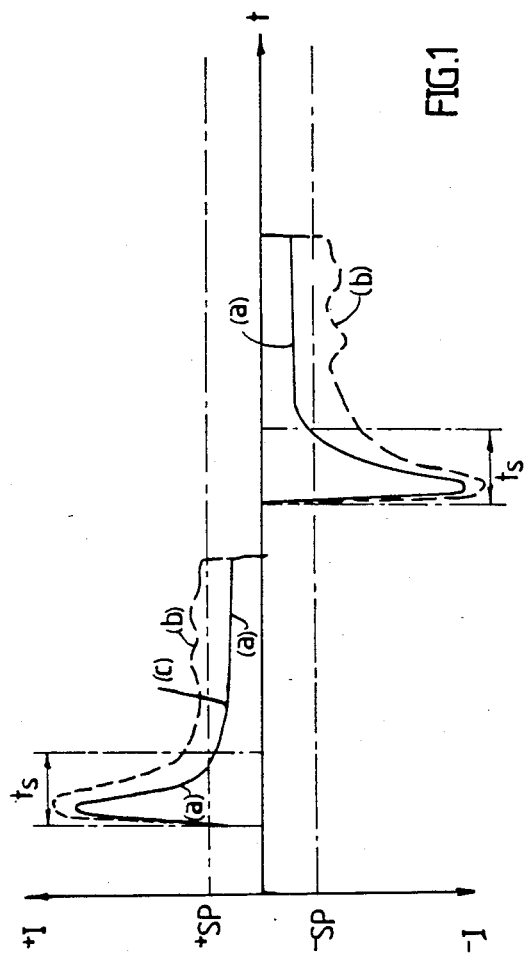

DOOR OR GATE OBSTRUCTION CONTROL

The present invention relates generally to power operated gates and doors and more particularly to a safety control arrangement associated with such doors and gates.

It has become reasonably common in recent times to provide garage door and property access gates with power operated opening and closing mechanisms. Commonly such arrangements include a suitable operating mechanism (dependent upon the nature of the door or gate being opened or closed) and an electric motor (which might be an AC or DC motor) to power the operating mechanism. The operating mechanism might be directly controlled by suitable switching associated with the equipment or it might be remotely controlled using radio signals directed to a suitable receiver arranged with the mechanism. The more common usage of remote control arrangements with such equipment has led to the substantial danger of seriously injuring persons or equipment which might be accidently located in the path of movement of the gate or door. For example the operating mechanism could conceivably be operated either intentionally or unintentionally from a position beyond the view of the operator and in such circumstances it would be possible for a person such as a child or perhaps a less agile elderly person to be seriously hurt by the door or gate. There have been many proposals for providing safety mechanisms with such doors and gates to try to avoid this danger. One such arrangement required the positioning of a mechanical trip bar which would be hit by any obstruction in the path of travel of the door or gate, the trip bar being operably connected to a suitable mechanical linkage for actuating a switch to either stop or perhaps reverse the operating motor. A similar concept in a mechanical system where a chain drive for the door or gate was employed, used deflections in the chain indicative of an obstruction being hit, to physically actuate suitable switching to stop or reverse the electric operating motor. These mechanical systems have been found in practice to lack sensitivity and reliability and moreover are relatively complicated and expensive to produce.

A second approach to this problem recognized that when a significant obstruction was engaged by the door or gate, the operating motor would draw significantly more current than was usual. Thus monitoring motor current, theoretically, gave some idea of whether or not the door or gate was operating freely. In a known static safety control system, it has been known to monitor motor current (after a predetermined start-up period) during the period when motor current should be theoretically relatively stable and to compare this current to a preset value such that if this preset current is exceeded indicative of an obstruction being engaged, a suitable control actuates to either stop or reverse the operating motor. While this known system is theoretically functional, it has proved to have significant problems in practice. In practice the current drawn by the motor during the opening or closing operating is never uniform. For example, on very cold days, lubricating grease will be vastly stiffer than on hot days thereby resulting in significant friction increases. Similarly wind loading varies considerably and has significant effects on loading of the door or gate during opening or closing. Furthermore, the current drawn by the motor running in one direction could vary up to 10% from that which would occur with the motor running in the reverse direction regardless of all these factors. In addition with certain types of doors or gates (typically lifting and tilting garage doors) the load during opening and closing is itself not constant and the theoretical current drawn by the motor increases substantially midway through its cycle. To achieve a sensitive safety control operation it is desired to place the set point as close as possible above the theoretical current drawn, however, because of the above factors, it has been found in practice that the set point must be placed greatly above the theoretical current drawn to avoid the safety control operating when it is not necessary. Often this has resulted in the safety control set point being set that high that it has very little appreciable effect in controlling the door or gate when an obstruction is in fact met.

The principal objective of the present invention is to provide a safety control for door or gate operating mechanism of improved performance characteristics which will be activated by the door or gate effectively meeting an obstruction in its path of travel. A so-called "dynamic set point" or "dynamic control threshold" is achieved effectively by sensing rate of change of operating characteristics of the operating motor of the door or gate mechanism which follows the normal motor load characteristic curve.

Accordingly the present invention provides an obstruction control arrangement for a door or gate opening/closing mechanism having an electric operating motor, said control arrangement comprising motor sensor means adapted to sense an operating characteristic of said motor, a first comparator means having two inputs and said operating characteristic being applied to both said inputs, circuit means associated with one of said inputs arranged to cause a time delay between said two inputs, said comparator means having an output representing the difference between said two inputs, and activating means arranged to stop or reverse said electric motor in response to an output of said first comparator exceeding a present level, being indicative of said door or gate being obstructed in its normal course of travel.

Conveniently the control arrangement further includes filter means arranged to pass signals only in a predetermined frequency range from said motor sensor means to the comparator means. The frequency range transmitted would normally be less than 10 Hertz and preferably in the range of 5 to 10 Hertz.

In accordance with a preferred embodiment the control arrangement further includes a back-up static control threshold of the type including a second comparator means arranged to compare the sensed operating characteristic of said motor with a preset static threshold level whereby an activating output signal is generated upon said sensed operating characteristic exceeding said preset threshold level and is delivered to said activating means to stop or reverse said electric motor. Conveniently a common motor sensor means is used for both the dynamic control threshold and the static control threshold. The arrangement may further include temperature compensation means arranged to sense operating temperature and to move the preset static threshold level automatically in response to temperature changes.

Preferably the temperature compensation includes a thermal sensor such as a Silicon diode or a Germanium diode arranged in a voltage divider network used to establish the present rate of change level for the comparator means.

In a preferred embodiment the operating temperature of the motor body is monitored indirectly as it is not desirable to have the thermal sensor physically attached to the motor body as this is most often remote from circuitry associated with the control of the door or gate opening/clsing mechanism and would require additional wires to carry the required information back to the main circuitry. Accordingly the present invention preferably proposes using the thermal sensor in contact with a power supply bridge rectifier for the opering motor as the entire motor current must flow through this bridge rectifier. Consequently it follows that the temperature of the bridge rectifier will rise in proportion to that of the remote operating motor. It is, however, desirable that the thermal inertia of the operating motor and the bridge rectifier circuit, be perfectly matched to achieve optimum results. Simultaneously, the same thermal sensor will also sense ambient temperature changes and consequently compensation is achieved for operating temperatures resulting from both ambient changes and changes due to the operation of the equipment.

A possible alternative location for the thermal sensor could be against a series resistor used to monitor the operating motor current. However, this is not quite as good a location as the power supply bridge rectifier circuit as the temperature rise of the monitoring resistor is much lower than the rectifier circuit where the power developed in heat is much higher.

In the embodiment of this invention there is provided inhibitor means arranged to inhibit operation of the control arrangement during an initial time period of each operating cycle.

The present invention will now be described with reference to several preferred embodiments illustrated in the accompanying drawings, in which:

FIG. 1 illustrates typical theoretical and practical operating characteristics of a door or gate operating mechanisms during both opening and closing cycles of operation;

Figure 2:
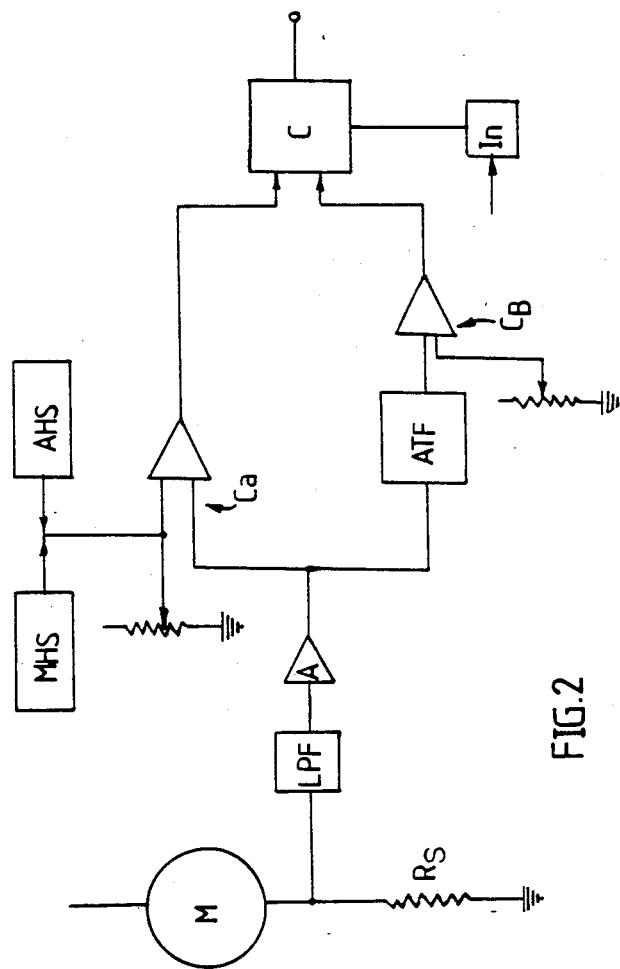
FIG. 2 shows, in block diagram form, a control arrangement in accordance with a preferred embodiment of the present invention employing both a dynamic threshold control and a temperature compensated back-up static control.
Figure 4:
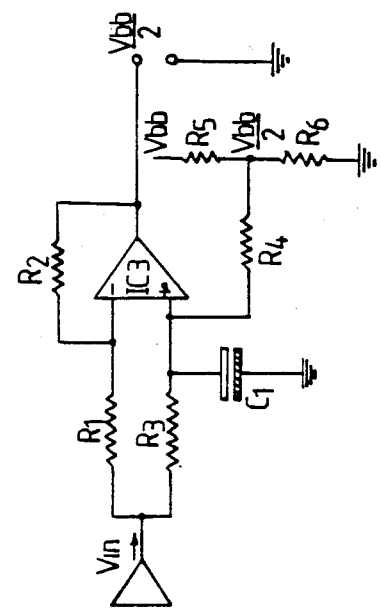
FIG. 4 shows typical circuitry for a dynamic tracking control system.
Figure 3:
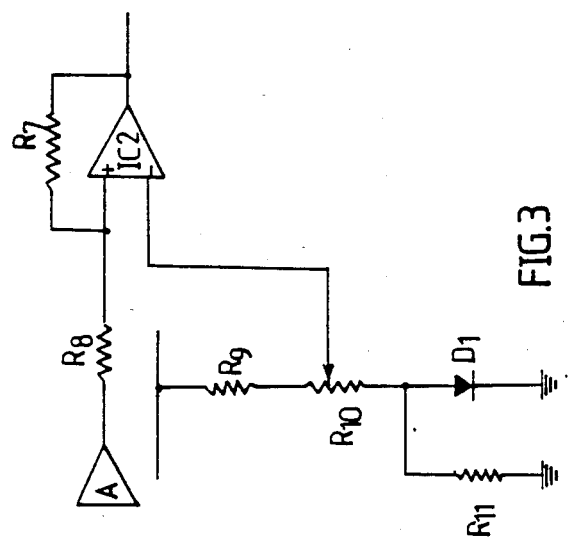
FIG. 3 shows typical circuitry for a temperature compensated static control system.
Figure 5:
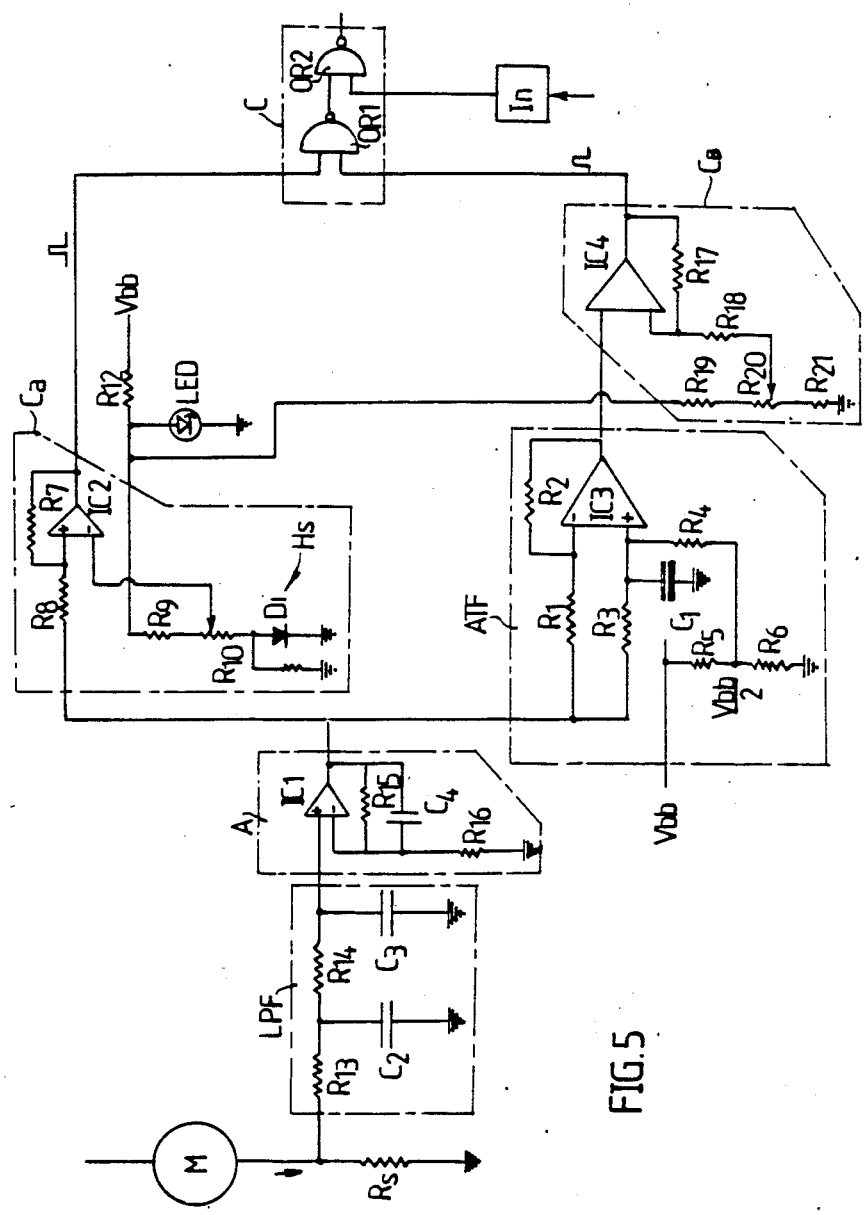

FIG. 5 shows typical circuitry for a control system employing both temperature compensated static control and dynamic tracking control; and shows expanded circuit detail of components shown in FIG. 2. Also, the location of the circuitry of FIG. 3 and FIG. 4 is shown, and FIG. 6 illustrates graphically operating characteristics according to the present invention. FIG. 2 of the drawings schematically shows in block diagram format a preferred control arrangement employing two independent control level sensing modes of operation. In the drawings M represents the operating motor for a gate or door opening/closing mechanism. Rs is a sensing resistor used to sense load or current drawn by the motor M. LPF represents a filter adapted to pass signals in a low frequency band (typically from 5 to 10 Hz) from the sensor Rs to the control circuit. An amplifier A amplifies and transmits the signal from the low frequency pass filter LPF to a temperature compensated comparator CA and separately to dynamic tracking controlled comparator CB which is adapted to compare rates of change of the current drawn by the motor M with a preset level. Each of the comparators CA and CB generate an activating signal in response to the load sensed by Rs exceeding a predetermined limit indicative of the door or gate hitting an obstruction. The activating signals are then combined by an OR logic gate shown as circuit C and used to either stop or reverse operation of the motor M. Finally an inhibitor circuit In is used to inhibit the control circuit for a predetermined period at start up of the operating motor for reasons which will be explained hereinafter.

Typical load operating characteristics of the motor M are shown in the drawings (FIGS. 1 and 6). FIG. 1 shows both an opening and a closing characteristic which can differ by up to 10% from each other. These graphs show motor current I against time but it will be appreciated that other operating characteristics might also be employed. Immediately upon start up there is a rapid rise in motor current drawn which peaks quickly and settles back almost as quickly into a theoretical substantially uniform load current. The full line graph (a) in FIG. 1 demonstrates a typical theoretical opening and closing load curve against time t. The critical start up period is irrelevant from a safety viewpoint and moreover the high load experienced in this period makes monitoring of the load pointless with regard to safety control. For this reason the inhibitor circuit In is included to override the control circuit for the initial start up period ts. Thereafter the control circuit becomes effective. In the conventional static control system a constant set point SP is established above the theoretical load curve such that if an obstruction is hit by the door or gate, the load curve rises rapidly as indicated at (c) and the door or gate is stopped or reversed. However as indicated in the introduction to this specification, the practical load curve (b) for many reasons will vary considerably from the theoretical curve (a) and it will be obvious from these graphs that either the set point SP must be set at a level which is too high for accurate sensing and safe operation or set at a level which the control system will activate due to the minor variations in the load curve when there is in fact no obstruction.

According to a preferred aspect of the present invention it has been recognized that the rotary action of the armature of the motor M with the resulting commutation of the brushes against the commutator give rise to finite opening and closing of the motor circuit at a relatively high "chopping" rate. typically the frequency of this occurs at around 300 per second but of course this high frequency chopping rate depends on the speed of the motor which is variable. In addition where the primary power source is derived from the 240 V main supply there will also be high components of 50 Hz and 100 Hz which is characteristic of the main supply. It is also recognized that frequencies resulting from an obstruction being hit by a door or gate will occur with a relatively well defined low frequency range width (normally within the range of 5 to 10 Hz). In the proposed system the aforementioned chopping high frequency component (and in other higher frequency component) is filtered out leaving only a DC average and frequency components up to a predetermined level, typically 10

Hz. This is achieved by the low frequency pass filter LPF shown in the drawings.

FIG. 6 of the drawings illustrates graphically the performance of the control system according to the preferred arrangement of FIG. 2. Firstly there is provided a movable constant stable set point Ssp. The set point is movable in response to temperature changes and in particular to both sensed ambient temperature changes AHS and sensed motor temperature changes MHS. If the temperature is generally cold then the motor is likely to draw more current and thus the set point Ssp is moved upwardly. Conversely if the temperature is hot the motor is likely to draw less current and the set point Ssp will move down. Conveniently both ambient and motor temperature changes can be sensed by single temperature sensing Silicon or Germanium diode Di. The positioning of this diode is discussed previously. As shown in FIG. 3 the signal from the motor sensing resistor Rs is filtered and amplified by an amplifier A and supplied to one input terminal of a non-inverting voltage comparator IC2. The temperature sensing diode Di directs its signal to the other terminal of the comparator and in this manner an automatic variation of the set point Ssp is achieved in response to temperature variations. Normally when the static temperature compensated control is being used as back-up in a combined system of the type shown in FIGS. 2 and 5, the basic set point will be arranged at a relatively high point such that it would only be used should the dynamic control fail for whatever reason.

FIG. 6 also illustrates the automatic tracking or dynamic threshold capability of the filter ATF to provide effectively an automatic dynamic set point Dsp above the actual load (b) regardless of changes in this load. Thus in the monitoring zone beyond the initial inhibit period ts should an obstruction be hit by the door or gate, the low frequency increase in load is passed by the filter LPF to the control system comprising the tracking filter ATF and the comparator CB. The load thus follows the curve (c) and the comparator CB will sense when the load exceeds the dynamic set point Dsp and will send a signal in response thereto to stop or reverse the motor M.

Suitable circuitry for the automatic tracking filter ATF is shown in FIG. 4 and essentially comprises an inverting amplifier. This circuit maintains its DC output at Vbb/2 for all input components up to 5 Hz such that it is not responsive to these components and more particularly maintains its output at Vbb/2 regardless of the absolute magnitude of the DC input. Its response is basically a high pass filter and allows through only those motor "impulse" components within the range 5 Hz to 10 Hz.

Experiments have shown that for most applications requiring a motorized door/gate to sense an obstruction, the impulse components predominantly lie within this spectrum. If required the band of interest could be lowered by changing $R_3/C_1$ and raised by appropriately decreasing the component values of the input filter LPF. The combination $R_3/C_1$ gives this filter the required tracking characteristic in that the voltage across $C_1$ follows (with some time delay) the input voltage being examined.

The integrated circuit IC3 arranged in the manner illustrated is in fact an Inverting Amplifier such that an impulse rising at Vin will cause the output to fall from its quiescent Vbb/2 level toward ground potential and vice versa. The gain (AC gain) is determined by the ratio of the components $R_2R_1$. The resistors $R_1$ and $R_3$ should preferably be equal and similarly the resistors $R_2$ and $R_4$ should preferably be equal to achieve good common mode operation. Should the components not be matched in this manner, the output voltage will not remain at Vbb/2 for all input components up to 5 Hz and consequently erratic operation could result. Normally components matched within ±2% would provide satisfactory operation. The magnitude of the output impulse response has been found to be adequate to trigger the following level comparator IC4 of the comparator circuit CB, if the gain of the integrated circuit IO3 is set within the range of 5 to 10. It is preferred for the capacitor $C_1$ to be a low leakage type whose value could be of the order of 10 microfarad when $R_1$ and $R_3$ are of the order of 100 K ohm. The time constant $R_3C_1$ is typically 0.1 second but could be raised to 0.5 second if required.

Once a sufficiently high impulse component at the input has been allowed through to the tracking filter ATF and consequently causes the output to swing below a predetermined value as set by the comparator CB, then an overload signal is generated which will stop the motor M. Subsequently, depending on the existing motor control logic, either a dwell will result or the motor will be instantly reversed. In either case the output of the tracking filter ATF will over shoot in the opposite direction, however, this is of no concern to the circuitry as an inhibit signal from the Inhibitor In holds the total response of the control circuitry in an "off" state.

We claim:

1. An obstruction control arrangement for a door or gate opening/closing mechanism having an electric operating motor, said control arrangement comprising motor sensor means adapted to sense an operating characteristic of said motor, a first comparator means having two inputs and a signal relating to said operating characteristic being applied to both said inputs, circuit means connected with one of said two inputs and arranged to cause a time delay between said two inputs, said first comparator means having an output representing the difference between the signal at said two inputs, and activating means arranged to stop or reverse said electric motor in response to the output of said first comparator means exceeding a preset level, being indicative of said door or gate being obstructed in its normal course of travel.

2. An obstruction control arrangement according to claim 1 further including filter means arranged to pass said signal only in a predetermined frequency range from said motor sensor means to the first comparator means.

3. An obstruction control arrangement according to claim 2 wherein the predetermined frequency range is from 0 to 10 Hertz.

4. An obstruction control arrangement according to claim 1 further including a second comparator means arranged to compare the sensed operating characteristic of said motor with a preset static threshold level whereby an activating output signal is generated upon said sensed operating characteristic exceeding said preset threshold level and is delivered to said activating means to stop or reverse said electric motor.

5. An obstruction control arrangement according to claim 4 further including temperature compensation means arranged to sense operating temperature and to move the preset static threshold level automatically in response to temperature changes.

6. An obstruction control arrangement according to claim 5 wherein said temperature compensation means comprises a thermal sensor located in thermal exchange relation with a power supply bridge rectifier for the motor.

7. An obstruction control arrangement according to claim 6 further including inhibitor means arranged to inhibit operation of the control arrangement during an initial time period of each operating cycle.

8. An obstruction control arrangement according to claim 6 wherein the operating characteristic is current drawn by said motor.

9. An obstruction control arrangement according to claim 6 wherein the operating characteristic is a voltage drop characteristic of said motor.

10. An obstruction control arrangement according to claim 1 wherein the said first comparator means comprises an inverting amplifier.

11. An obstruction control arrangement according to claim 10 wherein said circuit means comprises a capacitor.

* * * * *